Aug. 12, 1924.
J. J. ELSTER
1,504,466
ACCELERATOR CONTROL
Filed May 4, 1923
2 Sheets-Sheet 1
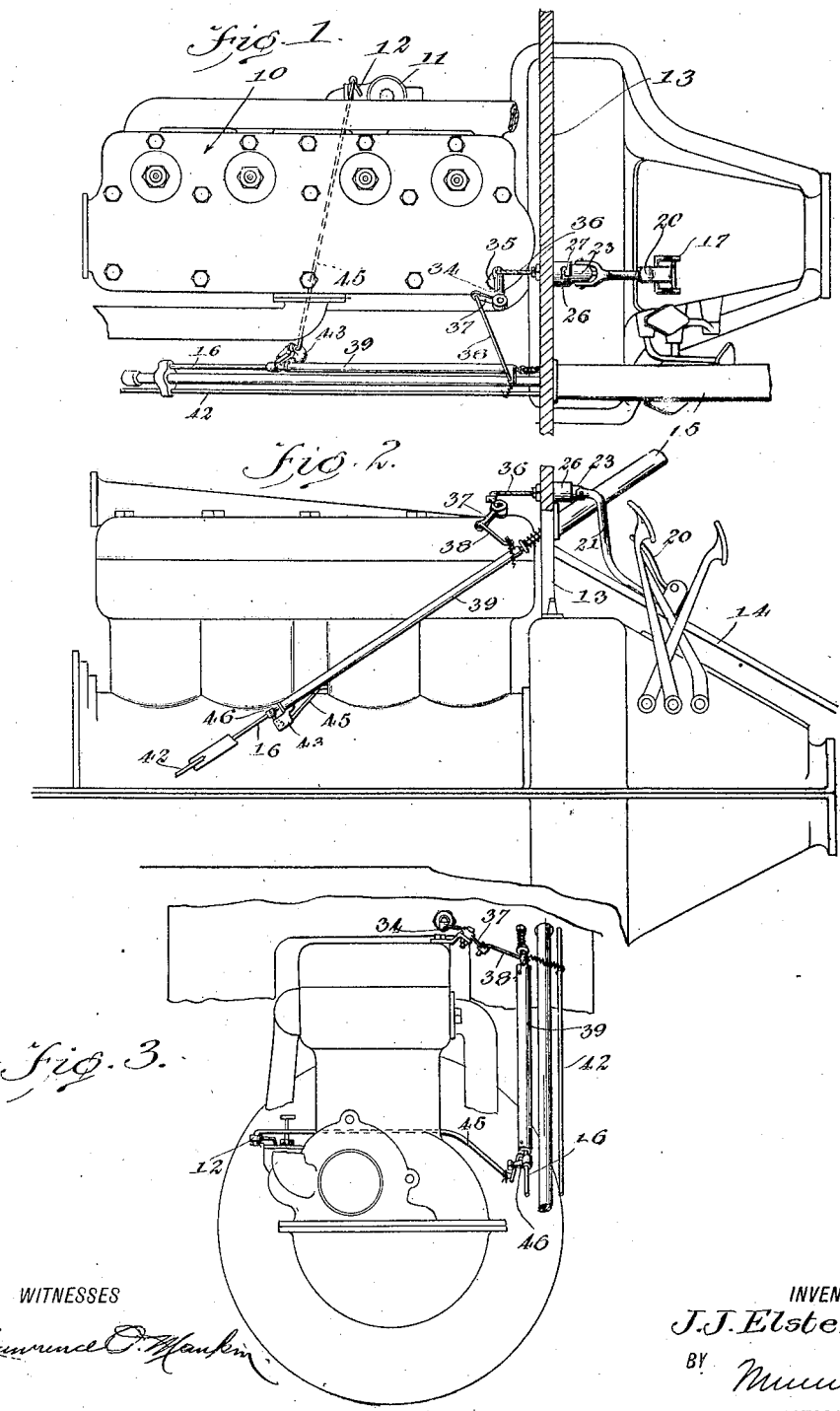
WITNESSES
INVENTOR
J. J. Elster,
BY
ATTORNEYS

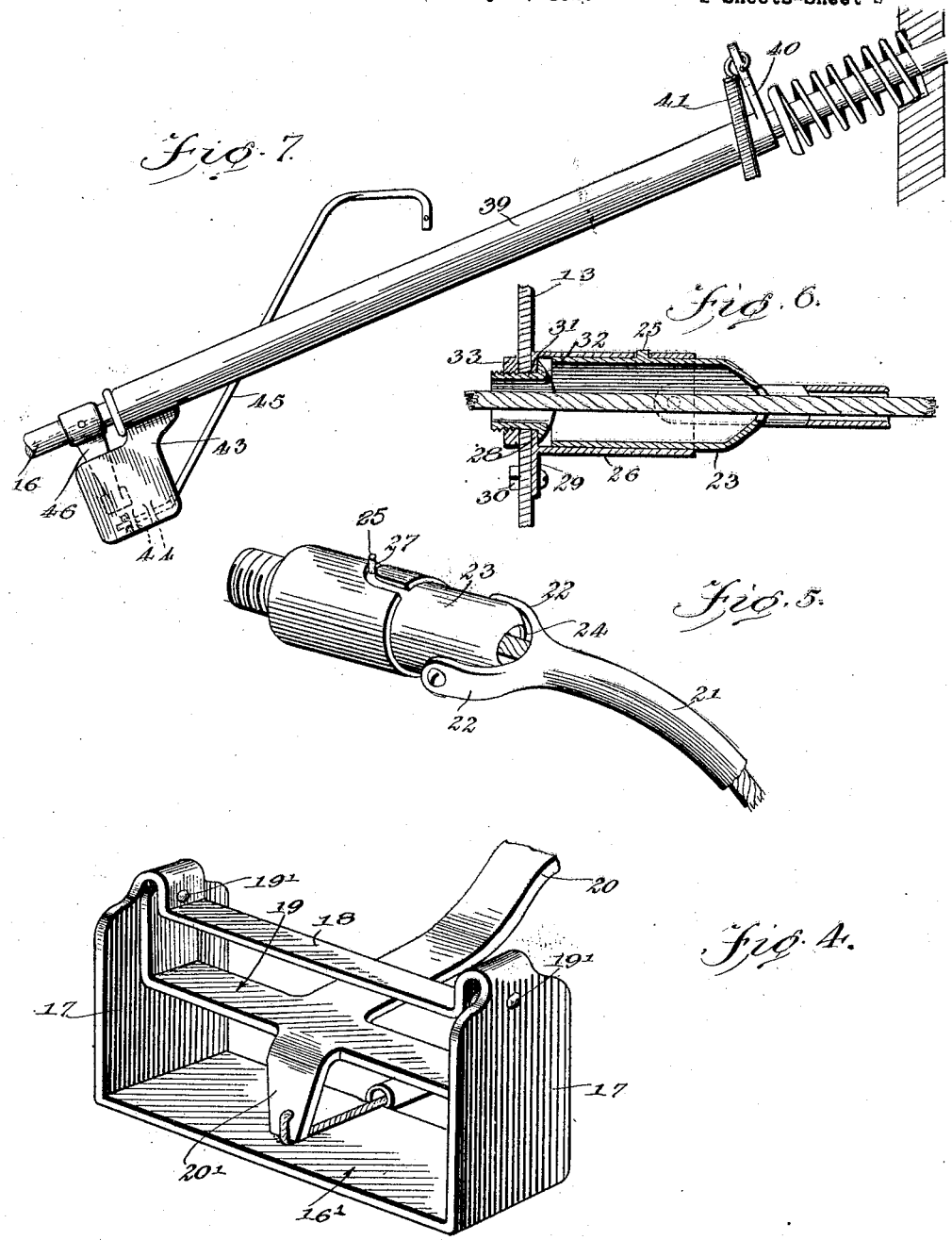

Patented Aug. 12, 1924.

1,504,466

UNITED STATES PATENT OFFICE.

JULIUS J. ELSTER, OF DOYON, NORTH DAKOTA.

ACCELERATOR CONTROL.

Application filed May 4, 1923. Serial No. 636,680.

*To all whom it may concern:*

Be it known that I, JULIUS J. ELSTER, a citizen of the United States, and a resident of the city of Doyon, in the county of Ramsey, State of North Dakota, have invented certain new and useful Improvements in Accelerator Controls, of which the following is a specification.

This invention relates to improvements in accelerator controls for engines on motor vehicles or the like.

The purpose of the invention is to provide an apparatus or operating means of the above character whereby the throttle of a carbureter of an engine carried by a motor vehicle may be positively operated by either a foot pedal or by the usual hand lever carried by the steering wheel of the motor vehicle.

It is also an important object of the invention that the apparatus be particularly adapted to be applied to a motor vehicle of the Ford manufacture and at a relatively low expense.

It is also an object of the invention that the foot pedal utilized be adapted to be folded and brought to a position so that the same will be out of the way of the operator of the vehicle when said pedal is not being used.

Other objects, and objects relating to details of construction, combination and arrangement of parts will hereinafter appear in the detailed description to follow.

The invention is illustrated by way of example in the accompanying drawings, in which:

Figure 1 is a top plan view of the front portion of a motor vehicle and showing the present invention applied, Figure 2 is a view in side elevation of the same, Figure 3 is a front elevation thereof, Figure 4 is a detailed perspective view showing the form of foot pedal employed in the present invention, Figure 5 is a detailed perspective view illustrating the manner in which the foot pedal is hingedly and foldably supported, Figure 6 is a detail sectional view further illustrating the means for hinging and foldably supporting the foot pedal, and Figure 7 is a detailed view illustrating the manner in which the usual throttle control rod is employed in connection with the operating elements of the present invention.

Like reference numerals refer to similar parts throughout the several views of the drawings.

Referring to the drawings in detail and particularly to Figures 1 to 3, inclusive, 10 indicates generally an internal combustion engine, 11 a carbureter therefor which is provided with the usual throttle valve having an operating lever 12 by which the same may be manipulated. At 13 there is shown the dash-board, 14 the floor boards, 15 the steering post and 16 the throttle operating rod supported by said steering post and operated by a hand lever carried by the associated steering wheel in the usual manner.

In carrying out the present invention there is provided a U-shaped base or supporting member 16', said member having leg portions 17 integrally connected by a brace member 18. A second U-shaped member 19 is provided which is fitted within the member 16' and has its terminals pivotally supported by rivets 19'. The bridge portion of the U-shaped member 19 is formed with an extension which is in the form of a foot pedal. The bridge portion of the U-shaped member 19 also has integrally connected therewith a tube 21, said tube terminating in a pair of prongs 22 at its free end and between said prongs there is pivoted a thimble 23, said thimble having an opening 24 at its inner end which is normally in alignment with the passage of the tubular member 21. The thimble 23 is formed upon its outer surface with a stud 25 and this thimble is positioned within a sleeve 26, said sleeve having a bayonet slot 27 adapted to receive the stud 25 positioned upon the nipple 23, and also the slot 27 is adapted to permit rotative movement of the thimble 23 without the same becoming disengaged from the sleeve 26 for a purpose which will later be described.

The sleeve 26 has its forward end provided with an internal flange 28 and also one or more tangs 29 by which the sleeve may be secured to the dash 13 by the means of bolts or rivets, as indicated at 30. The sleeve 26 is further secured to the dash 13 by a nipple 31, said nipple having a head 32 adapted to engage the internal flange 28 of sleeve 26 and said nipple extending through a suitable opening in the dash 13 and having threaded upon its outer end a nut 33, and thereby to lock the sleeve 26 in its applied position and also to provide a passage through the dash 13 which is in axial alignment with the bore of the thimble 23.

Upon the engine 10 there is pivotally mounted a bell-crank lever 34, said bell-crank lever having its arm 35 connected to the one end of a cable 36 and said cable being extended through the nipple 31, thimble 23, tubular member 21 and having its other end secured to an arm 20 depending from the bridge portion of U-shaped member 19. The other arm 37 of the bell-crank lever 34 has secured thereto the one end of a link 38.

Upon the control rod 16 there is turnably mounted a sleeve 39, said sleeve being preferably split, as shown, so that the same may be easily mounted upon the rod 16 and at one end of the sleeve there is formed a radial extension or arm 40 which has its free end pivotally connected to the other end of the link 38. A coil spring 41 is also connected to the free end of the arm 40 as shown to advantage in Figure 7, and the other end of the coil spring is connected to the rod 42 which is the usual rod employed for advancing and retarding the spark of the engine cylinders. The rod 42 in this instance merely serves as a stationary means to which the one end of the spring 41 may be secured.

The lower end of the sleeve 39 is also provided with a radial extension 43 which is plate-like in formation and which has formed upon its one side and adjacent its outer end a pair of apertured ears 44, said ears being adapted to journal the one end of a rod 45, as shown in Figure 7, and the rod 45 is extended as shown in Figure 1 and its other end suitably connected to the lever 12 of the throttle valve heretofore referred to.

The rod 16 has secured thereto the usual crank member 46 which is adapted to engage with the extension 43 of the sleeve 39 and thereby permit the sleeve 39 to be rotated and the rod 45 manipulated for operating the throttle valve through the usual means; that is, the hand lever carried by the steering wheel for rotating the rod 16.

In use of the present invention the pedal 20 is positioned as shown in Figures 1 and 2 and the operator of the motor vehicle may place either his right or left foot upon the cross member 18 of the U-shaped member 16 and when it is desired to increase the feed of fuel to the engine cylinders he should depress the pedal 20 and with this occurring the bell-crank 34 will be operated in an obvious manner for rotating the sleeve 39 in a clockwise direction, whereby the extension 43 of said sleeve will be moved to actuate the rod 45 to open the throttle controlled by the lever 12. Upon the operator removing his foot from the pedal 20 the spring 41 will operate to return the throttle to its original position.

Also in case the operator wishes to use his hand lever on a wheel for operating the accelerator or throttle of the carbureter then he may rotate the rod 16 in the proper direction which will actuate the rod 45 in a manner heretofore described.

Should the operator not desire to use the foot pedal for operating the throttle he may fold the same so that it will be entirely out of the way. In folding the foot pedal the same is swung upwardly upon its pivot connection with the thimble 23 and after the tubular member 21, together with the foot pedal and supporting member 16' have been brought to a substantially vertical position, the same may be swung either to the right or the left so that they rest upon the foot board of the motor vehicle and thus be entirely out of the way of the operator.

While I have shown and described the preferred form of my invention, I wish it to be understood that I am aware of the fact that the construction, combination and arrangement of parts may be changed by those skilled in the art, without departing from the spirit of the invention, as indicated by the appended claims.

I claim:

1. In an apparatus of the character described, a supporting member, a pedal carried thereby, a supporting wall, an extension carried by the lever support, a hinge connected between said extension and wall whereby to permit the pedal to be folded against said wall, and means whereby upon said pedal being folded the same may be turned a predetermined degree for the purpose described.

2. In an apparatus of the character described, a U-shaped supporting member, a second U-shaped member disposed within the first-named U-shaped member, a pivot connection between each leg of the first-named U-shaped member and the associated leg of the second U-shaped member, and a foot pedal extending laterally from the bridge portion of the second-named U-shaped member.

3. In an apparatus of the character described, a U-shaped supporting member, a brace extending between the terminals of said U-shaped member, said brace terminating at its ends in an inverted U-shaped portion, a second U-shaped member disposed within the first-named U-shaped member and having its ends disposed within the inverted U-shaped portions of said brace, a pivot connection whereby to rockably support the second-named U-shaped member in the position described, and a foot pedal extending laterally from the bridge portion of said second-named U-shaped member.

JULIUS J. ELSTER.